1,937,955

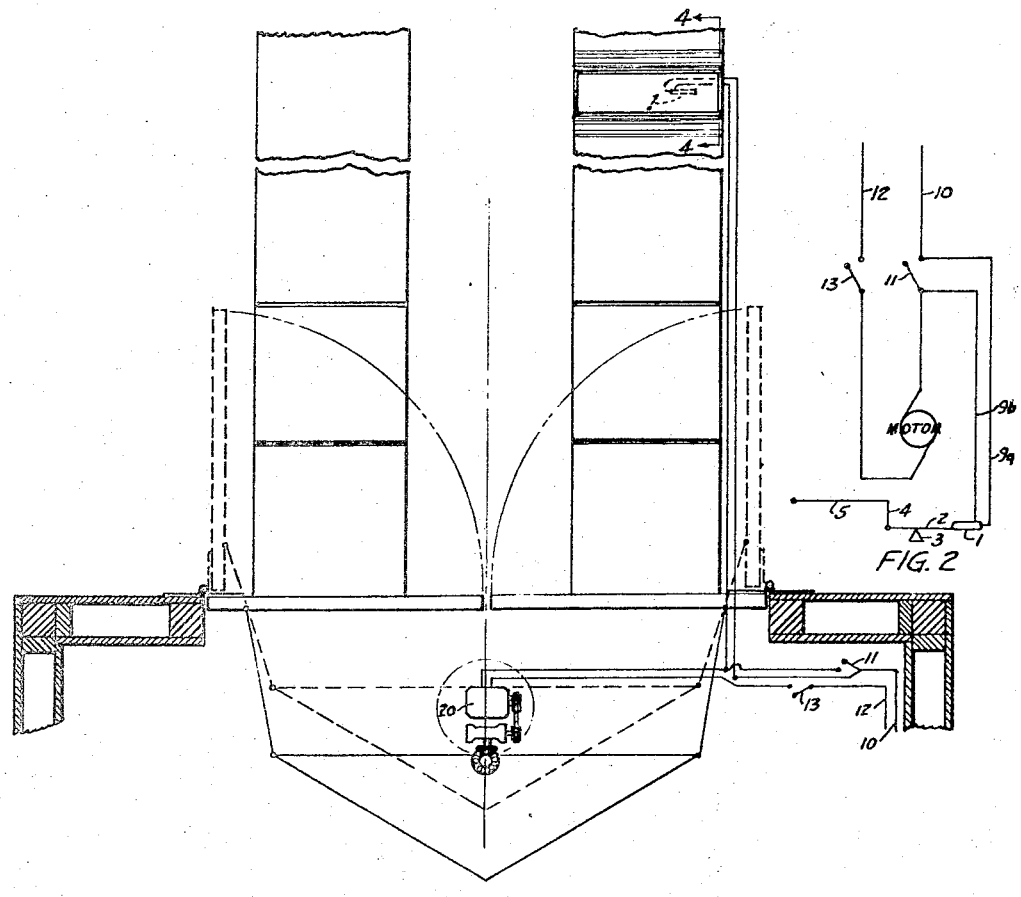
FIG. 1
FIG. 2
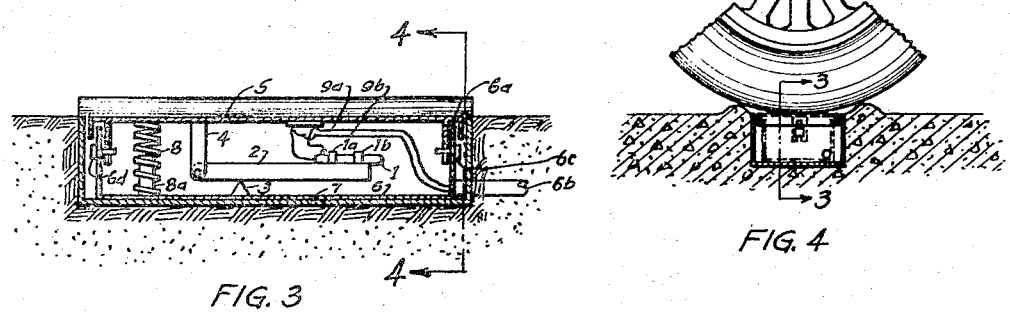
FIG. 3
FIG. 4
INVENTORS
FRANK W. HALL
GEORGE C. FAIRBAIRN INVENTORS
FRANK W. HALL
GEORGE C. FAIRBAIRN
BY THEIR ATTORNEY H. A. Smith Patented Dec. 5, 1933

UNITED STATES PATENT OFFICE 1,937,955

CLOSURE OPERATOR

Frank W. Hall and George C. Fairbairn, Port Arthur, Tex., assignors of one-third to Harris A. Smith, Port Arthur, Tex.

Application August 2, 1929. Serial No. 383,011

4 Claims. (Cl. 268—33)

The present invention relates to mechanical control apparatus for garage doors and the like and relates more specifically to closure operator for opening and closing doors.

The invention consists briefly of electrically driven mechanism adapted to open and close doors continuously, and it includes an adjustable switch feature which is suited to be tripped by vehicles within any optimum range of weight.

For example, our invention may be applied to a pair of garage doors hinged on the sides which open outwardly where an approach to the garage, which may be of concrete or another hard substance, serves as a drive way for the vehicle.

A switch, preferably of the mercury type, enclosed in a substantially water proof housing having a depressible cover lid is situated in the driveway at a proper distance from the garage. The housing is set below the surface of the driveway so that its cover lid is approximately flush with the driveway surface. The surface of the driveway is provided with two small levees, one on either side of the switch housing, so that when an automobile wheel rolls upon the cover lid of the housing and is not brought to rest exactly thereupon the wheel will roll down one or the other of the levees and gradually rock into position resting exactly upon the lid. As a wheel of the driven vehicle rolls upon the lid of the housing and is brought to rest thereupon it depresses the lid sufficiently to trip the enclosed switch which closes an electric circuit and sets the mechanism in motion which acts upon the doors.

Thus as an automobile approaches the garage with the doors closed and one of its wheels is brought to rest upon the depressible switch the power is switched on and the mechanism opens the doors. As soon as the doors are opened to a proper degree the automobile is driven off of the switch box and the depressible lid springs back into its normal position thereby tripping the switch and breaking the circuit whereupon the mechanism ceases to function and the doors accordingly stop.

Should the automobile remain upon the switch box lid an undue length of time the mechanism would simply continue to open and close the doors harmlessly, shutter fashion. It may, however, be stopped at any time with the doors in any desired position either by moving the automobile off of the switch box or by manipulating a hand switch which is provided in the interior of the garage, or if the automobile is in the garage with the doors closed another hand switch in the garage may be thrown to cause the current to travel direct to the mechanism, i. e. to bypass the depressible switch outside, and thus effect the opening of the doors.

As the control mechanism is always in gear it is to be perceived that with the doors closed and the electric current shut off completely a very effective locking of the doors is accomplished. It may be preferable to enclose one of the hand switches in a lock box or for that matter in another building so that it would be inaccessible to unauthorized persons and the necessity of otherwise locking the doors would thereby be obviated.

These with other novel features of the invention will be better understood from the following detailed description and the accompanying drawings showing a preferred embodiment of the invention in which:

Fig. 1 is a plan view of an approach and an entrance to a garage showing the invention diagrammatically.

Fig. 2 is a wiring diagram of the electrical system in connection with the invention.

Fig. 3 is a view taken on the line 3—3 of Fig. 4, omitting the vehicle wheel.

Fig. 4 is a view taken on the line 4—4 of Fig. 1 showing a fragmentary portion of a vehicle wheel in elevation.

Figure 5:
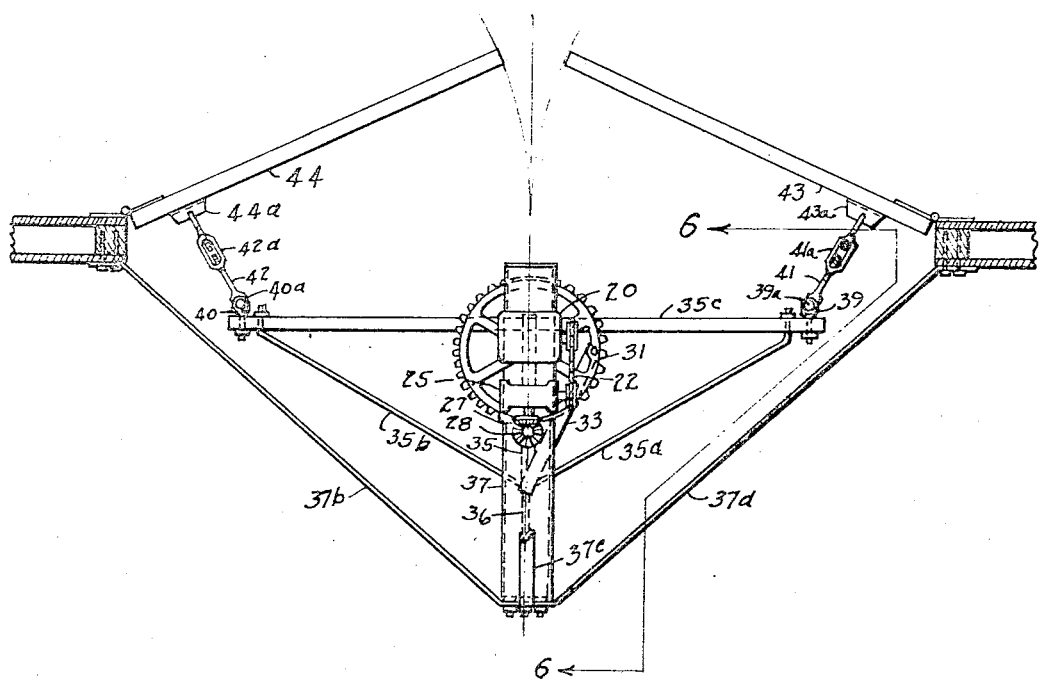
Fig. 5 is a view taken on the line 5—5 of Fig. 6.

Referring to the drawings a switch 1, preferably of the enclosed mercury type, having appropriate lead wires $9a$ and $9b$, is secured by means of adjustable cleats $1a$ and $1b$ upon an end of a lever 2 resting on a fulcrum 3 and linked to a depending member 4 which is rigidly secured to a cover lid 5.

The cover lid 5 which is preferably turned down at the edges and welded at the corners fits loosely over a tray-like leak proof base 6. One end of the lid 5 rests upon an end wall $6a$ of the tray 6 which is set loosely in another tray 7, the side walls of which are higher than the adjacent side walls of the tray 6, while the other end rests upon a helical spring 8 and when depressed is brought to rest upon that end wall and the side walls of the tray 6.

It is to be understood that the complete switch box which is comprised of the lid 5 and tray 6 set within the tray 7, is made waterproof. The connection of the conduit $6b$ to the tray 6 is properly packed and the cap screws $6c$ and $6d$ are provided with gaskets to exclude water. Thus even though the entire box be submerged it is effectively sealed.

The spring 8 is held in proper positon by a pin $8a$ which is secured at its base to the tray 6. The location of the spring 8 may be changed with relation to the ends of the tray 6 or it may be substituted for a stronger or a weaker spring. Either shifting the spring or substituting one of different strength will effect a change in the load required to depress the lid 5 sufficiently to throw the switch 1. Another method is to alter the position of the fulcrum 3 so that a lesser or greater amount of depression, such as would be caused by relatively light or heavy cars, would cause a sufficient movement of the lever 2 to trip the switch 1.

The most preferable method of adjusting the switch 1 however is to change, i. e. to increase or decrease the angle of its normal posture so that a relatively light car will not depress the lid 5 sufficiently to trip the switch 1 while a relatively heavy car will do so. In other words a heavy car will depress the lid 5 until it rests upon the supporting wall members of the tray 6 and the switch being previously set at a desired angle by means of the adjustable cleats 1a and 1b will be tripped.

The switch 1 is so situated that when the lid 5 is in a normal position, i. e. when not depressed, the mercury in the switch is at or near the end opposite from lead wires 9a and 9b and consequently the circuit is normally broken. When the lid 5 is depressed the switch 1 tilts and the mercury flows to the opposite end of the tube and closes the circuit.

Referring now to Figs. 1 and 2, a suitable lead wire 10 is brought from any source of electrical energy around thru the switch 1 and back to a motor 20. Another wire 12 is brought direct to the motor having an interposed switch 13. Still another switch 11 is provided for connecting two points in the wire 10 to exclude or bypass the switch 1. As previously briefly mentioned, one of the switches, preferably 13, may be placed in a lock box or in another building to thus make it inaccessible to unauthorized persons and also to effect a locking of the doors.

Figure 6:
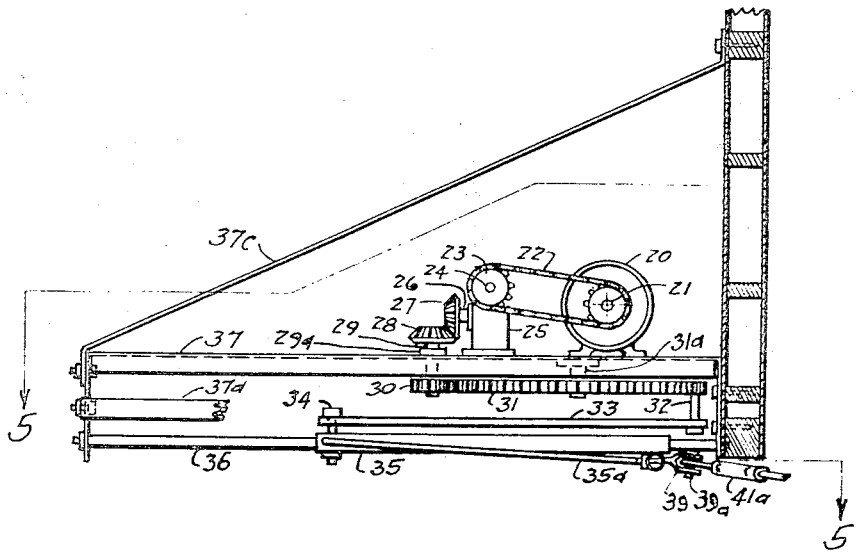
Fig. 6 is a view taken on the line 6—6 of Fig. 5.

Referring now particularly to Figs. 5 and 6 the motor 20 has a chain sprocket wheel 21 attached to its shaft and is linked by a loop of appropriate chain 22 to another sprocket wheel 23 which is rigidly mounted on a shaft 24 of a speed reduction gear 25.

A bevel gear 27 rigidly mounted on a shaft 26 of the speed reduction gear 25 cooperates with another bevel gear 28 which is rigidly mounted on the upper end of a vertical shaft 29 having a pinion 30 rigidly mounted on its lower end. The shaft 29 is supported by a suitable bearing 29c. A spur gear 31 cooperates with the pinion 30 and is supported by a depending shaft 31a. One end of an arm 33 is loosely secured to a pin 32 which is rigidly attached to the underside of the rim of the gear 31 while the other end of the arm 33 is loosely secured to a pin 34 which is rigidly attached to a sleeve, or tube 35 which is slidably mounted on a rod 36.

The ends of the rod 36 are secured to the depending end portions of a bracket 37 which also serves as a mounting for other parts of the apparatus. The bracket 37 is braced laterally by bars 37a and 37b, and is supported at the outer end by the bar 37c.

Brace rods 35a and 35b extend from attachments near one end of the slidable tube 35 to attachments near the ends of a lateral member 35c, which latter is rigidly attached near its center to the underside of the tube 35 near the end opposite which the brace rods 35a and 35b are attached thus forming a rigid frame with the tube or sleeve 35 serving as a portion of it. Bifurcated members 39 and 40 having pins 39a and 40a are secured to the ends of the tube 35c and serve as securing members for swinging members 41 and 42. The swinging members 41 and 42 are loosely but securely attached to lugs 43a and 44a on the doors 43 and 44. Turnbuckles 41a and 42a are provided for adjusting the length of the members 41 and 42 so as to compensate for any lack of symmetry in the corresponding parts each member cooperates with or for error of measurement in erecting or the like.

In operation, with the switch 11 open and the switch 13 closed, a car rolls upon the depressible lid 5 the switch 1 is tilted, thus closing the circuit, and the motor 20 set in motion. Thru the system of gears the spur gear 31 is rotated at appropriate speed, and by its circular motion thru the interconnecting arm 33 a linear reciprocating movement of the tube 35 is effected. As the tube 35 moves or slides back and forth, along its mounting rod 36, with the attached rigid frame comprised of the brace rods 35a and 35b and the tubular member 35c having attached to its ends the adjustable swinging members 41 and 42 it opens and closes the doors 43 and 44.

Obviously minor changes can be made to our invention as herein set forth without altering its spirit and scope therefore it is desired that it be limited only by the foregoing description and the appended claims.

We claim:

1. In a door operating mechanism the apparatus in combination that comprises a motor operated slidable tubular member, a supporting rod upon which the tubular member slides, a lateral member rigidly attached to one end of the slidable member, brace members extending from the opposite end of the slidable member to the ends of the lateral member, and door operating arms connecting the ends of the lateral member and doors to be operated.

2. In a door operating mechanism the apparatus in combination that comprises a motor operated slidable tubular member, a supporting rod upon which the tubular member slides, a lateral member rigidly attached to one end of the slidable member, brace members extending from the opposite end of the slidable member to the ends of the lateral member and longitudinally adjustable articulated door operating arms connecting the ends of the lateral member and doors to be operated.

3. A door operating mechanism comprising in combination a motor operated reciprocably slidable tubular member, a supporting rod upon which the tubular member slides, a lateral rigid frame rigidly attached to one end of the slidable member, brace members extending from the opposite end of the slidable member to the ends of the lateral member and longitudinally adjustable articulated door operating members connecting the ends of the frame and doors to be operated.

4. In a door operating mechanism including a pair of doors to be operated and supporting means for the operating mechanism the combination that comprises a motor operated slidable sleeve, a cross member and brace rods forming a rigid frame arranged laterally with and attached to the slidable sleeve, the slidable sleeve forming a rigid portion of the frame, and articulated swinging members connecting the ends of the frame and the doors.

FRANK W. HALL.
GEORGE C. FAIRBAIRN.